United States Patent
Dowty et al.

(10) Patent No.: US 11,613,358 B2
(45) Date of Patent: Mar. 28, 2023

(54) AIRCRAFT INTERIOR STRUCTURE INCLUDING A SURFACE AND AN INTEGRATED FOOTWELL

(71) Applicant: B/E AEROSPACE, INC., Winston-Salem, NC (US)

(72) Inventors: Mark B. Dowty, Rural Hall, NC (US); Daniel N. Moe, Mukilteo, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 219 days.

(21) Appl. No.: 16/888,618

(22) Filed: May 29, 2020

(65) Prior Publication Data
US 2021/0261255 A1 Aug. 26, 2021

Related U.S. Application Data

(60) Provisional application No. 62/981,327, filed on Feb. 25, 2020.

(51) Int. Cl.
*B64D 11/06* (2006.01)
*B64D 11/00* (2006.01)

(52) U.S. Cl.
CPC .......... *B64D 11/00* (2013.01); *B64D 11/0601* (2014.12); *B64D 11/0606* (2014.12); *B64D 11/0641* (2014.12)

(58) Field of Classification Search
CPC ............ B64D 11/0601; B64D 11/0606; B64D 11/0641
See application file for complete search history.

(56) References Cited

U.S. PATENT DOCUMENTS

| | | | |
|---|---|---|---|
| 10,232,942 B2 | 3/2019 | McKee | |
| 10,336,455 B2 | 7/2019 | McIntosh et al. | |
| 10,442,535 B2 | 10/2019 | McKee | |
| 2010/0187357 A1* | 7/2010 | Funke | B60N 3/001 244/118.6 |
| 2013/0206905 A1* | 8/2013 | Savian | B64D 11/04 29/428 |
| 2014/0361585 A1* | 12/2014 | Henshaw | B60N 3/002 297/217.3 |
| 2017/0267350 A1 | 9/2017 | Heidtmann et al. | |

(Continued)

FOREIGN PATENT DOCUMENTS

| | | |
|---|---|---|
| DE | 102006052536 A1 | 5/2008 |
| WO | 2018178276 A1 | 10/2018 |

OTHER PUBLICATIONS

Extended Search Report for European Application No. 21158408.1 dated Jun. 25, 2021, 7 pages.

*Primary Examiner* — Tye William Abell
(74) *Attorney, Agent, or Firm* — Suiter Swantz pc llo

(57) ABSTRACT

An aircraft interior structure may include a social area section including a surface. The social area section may be accessible from a floor area of an aircraft cabin. The aircraft interior structure may include a passenger seating section proximate to an aircraft seat. The passenger seating section may include a footwell. The aircraft interior structure may include a partition separating the passenger seating section and a first portion of the social area section. The footwell of the passenger seating section may be positioned underneath at least one of the partition or the surface of the social area section in a second portion of the social area section.

15 Claims, 13 Drawing Sheets

(56) References Cited

U.S. PATENT DOCUMENTS

| | | | |
|---|---|---|---|
| 2017/0283059 A1* | 10/2017 | McKee | B64D 11/0626 |
| 2017/0283063 A1* | 10/2017 | Johnson | B64D 11/0023 |
| 2018/0118350 A1* | 5/2018 | Davis | A47B 83/00 |
| 2018/0273182 A1 | 9/2018 | Savian et al. | |
| 2020/0216177 A1* | 7/2020 | White | B64D 11/0606 |

* cited by examiner

AIRCRAFT INTERIOR STRUCTURE INCLUDING A SURFACE AND AN INTEGRATED FOOTWELL

CROSS-REFERENCE TO RELATED APPLICATIONS

The present application claims the benefit under 35 U.S.C. § 119(e) of U.S. Provisional Patent Application Ser. No. 62/981,327, filed Feb. 25, 2020, titled AIRCRAFT INTERIOR STRUCTURE INCLUDING A SURFACE AND AN INTEGRATED FOOTWELL, naming Mark B. Dowty and Daniel N. Moe as inventors, which is incorporated herein by reference in the entirety.

BACKGROUND

Aircraft cabin designs may include aircraft interior structures that are separately-constructed and separately-installed within the aircraft cabin. The separate nature of the aircraft interior structures may result in a loss of valuable space (e.g., floor space, stowage space, or the like) within the aircraft cabin.

SUMMARY

An aircraft interior structure is disclosed, in accordance with one or more embodiments of the disclosure. The aircraft interior structure may include a social area section including a surface. The social area section may be accessible from a floor area of an aircraft cabin. The aircraft interior structure may include a passenger seating section proximate to an aircraft seat. The passenger seating section may include a footwell. The aircraft interior structure may include a partition separating the passenger seating section and a first portion of the social area section. The footwell of the passenger seating section may be positioned underneath at least one of the partition or the surface of the social area section in a second portion of the social area section.

In some embodiments, the surface may include at least one accessible exterior edge proximate to the floor area. The exterior edge may be accessible from the floor area.

In some embodiments, the surface may include at least one accessible interior edge proximate to a bounded space of the floor area. The interior edge may be accessible from the bounded space.

In some embodiments, the surface may include at least one actuatable portion. The at least one actuatable portion may be configured to provide access to the at least one crew member-accessible interior edge and the bounded space of the floor area.

In some embodiments, the social area section may include at least one seat proximate to the at least one passenger-accessible exterior edge.

In some embodiments, the at least one seat may be fixed in position.

In some embodiments, the at least one seat may be configured to actuate between a stowed position and a deployed position.

In some embodiments, the floor area may include an aircraft aisle.

In some embodiments, the aircraft seat may be parallel to the aircraft aisle.

In some embodiments, the aircraft seat being set at an angle relative to the aircraft aisle.

In some embodiments, the aircraft interior structure may include a plurality of support structures. The plurality of support structures may be configured to at least one of support the surface or define the passenger seating section.

In some embodiments, the footwell may be proximate to the aircraft aisle and at least one exterior support structure of the plurality of support structures.

In some embodiments, the footwell may be centered within the passenger seating section of the aircraft interior structure.

In some embodiments, the passenger seating section may further include an ottoman within the footwell. The ottoman and the aircraft seat may be configured to form a bed surface when the aircraft seat is in a lie-flat position.

An aircraft cabin is disclosed, in accordance with one or more embodiments of the disclosure. The cabin may include at least one passenger compartment. The at least one passenger compartment may include an aircraft seat. The aircraft cabin may include a floor area. The aircraft cabin may include an aircraft interior structure. The aircraft interior structure may include a social area section including a surface. The social area section may be accessible from the floor area. The aircraft interior structure may include a passenger seating section proximate to the aircraft seat of the at least one passenger compartment. The passenger seating section may include a footwell. The aircraft interior structure may include a partition separating the passenger seating section and a first portion of the social area section. The footwell of the passenger seating section may be positioned underneath at least one of the partition or the surface of the social area section in a second portion of the social area section.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
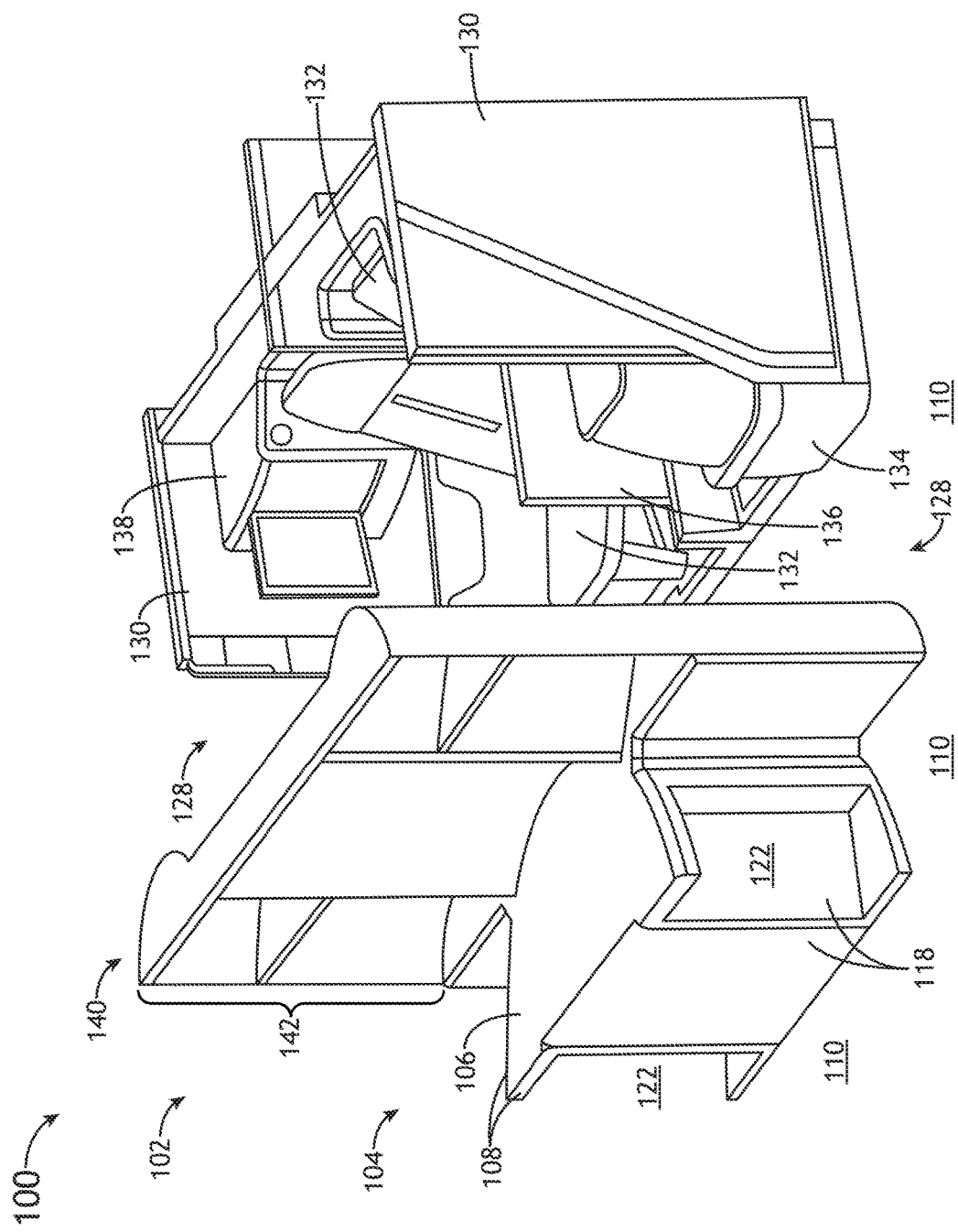
FIG. 1 illustrates a perspective view of an aircraft interior structure including a surface and an integrated footwell, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Figure 2:
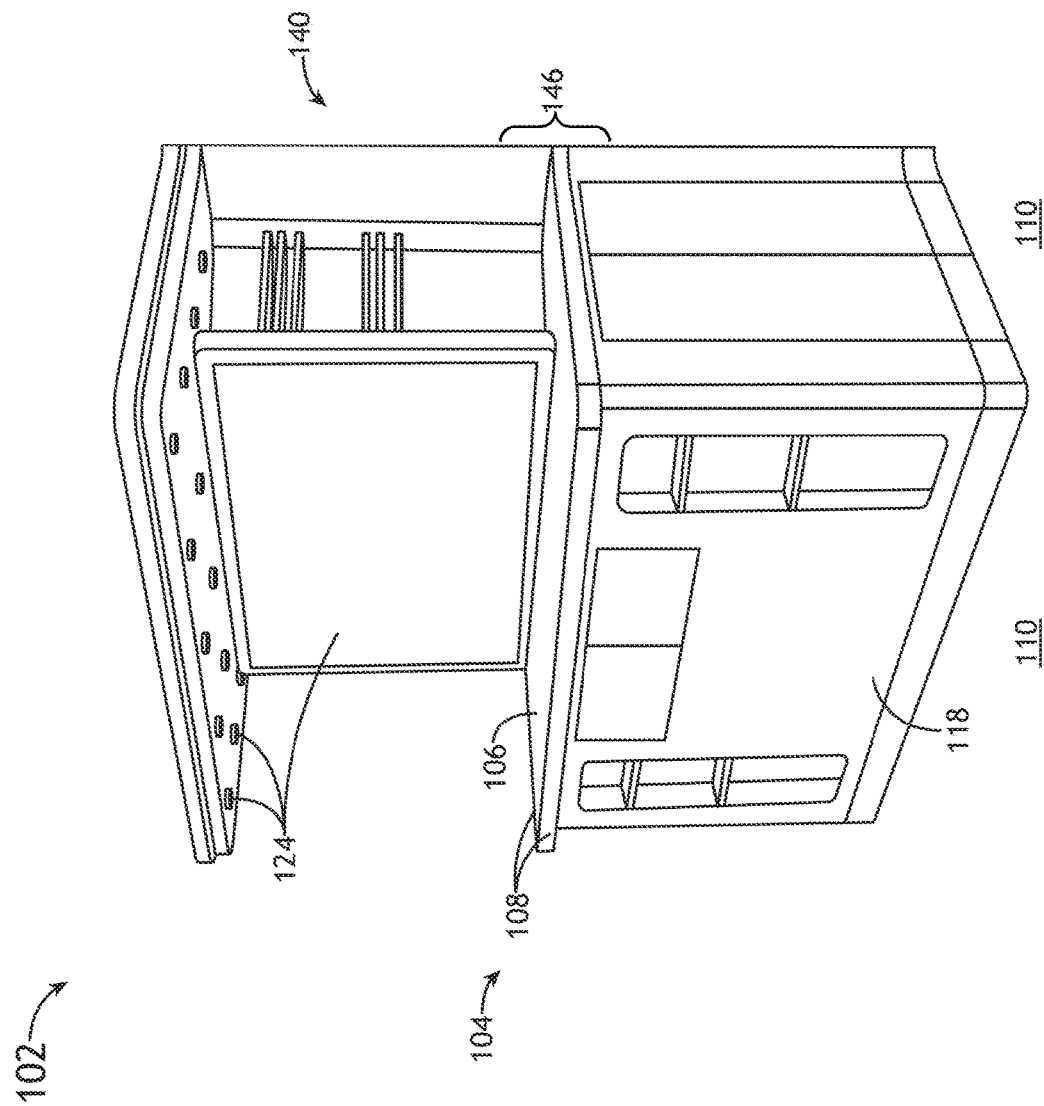
FIG. 2 illustrates a perspective view of an aircraft interior structure including a surface and an integrated footwell, in accordance with one or more embodiments of the disclosure.
Figure 3:
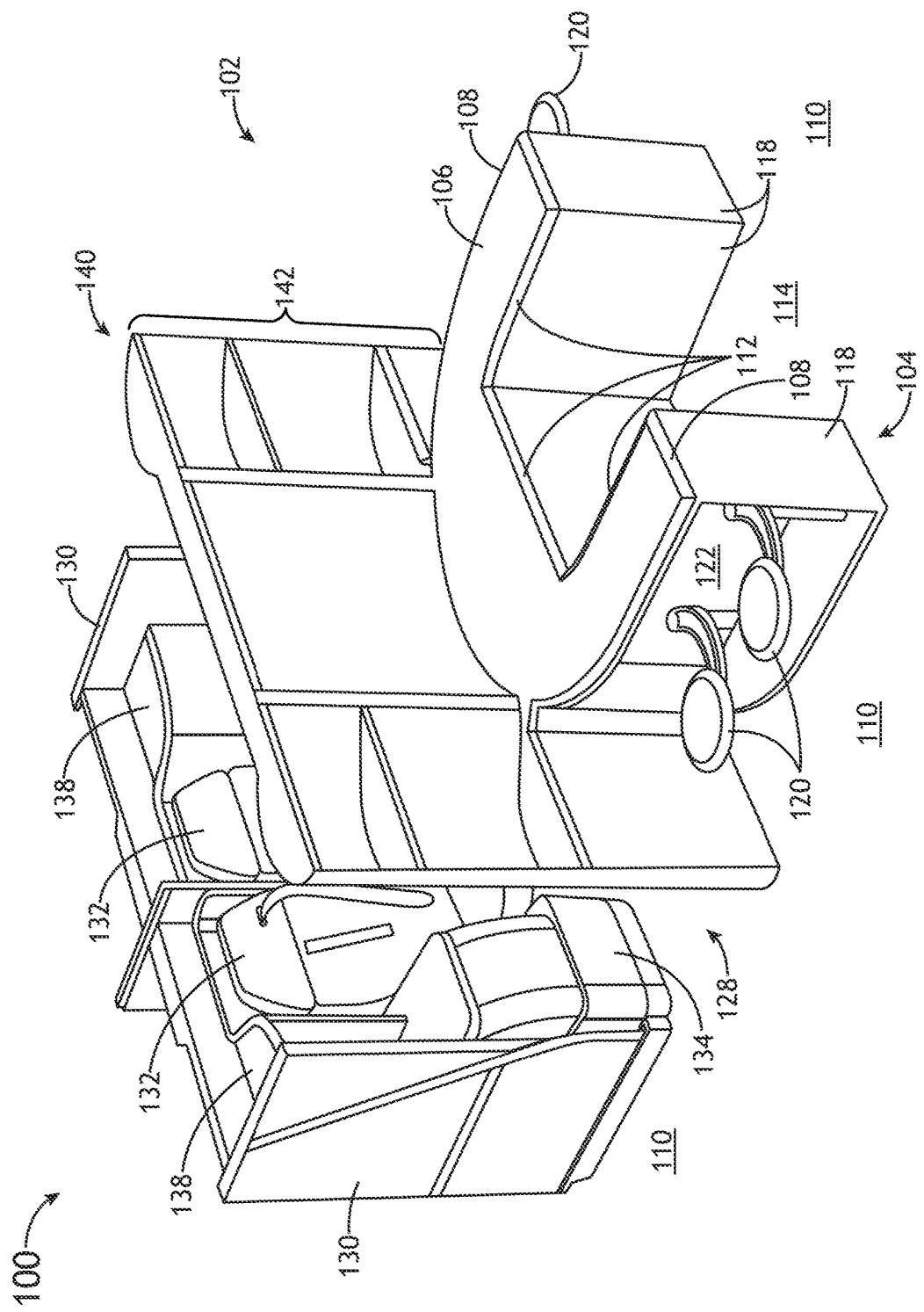
FIG. 3 illustrates a perspective view of an aircraft interior structure including a surface and an integrated footwell, in accordance with one or more embodiments of the disclosure.
Figure 4:
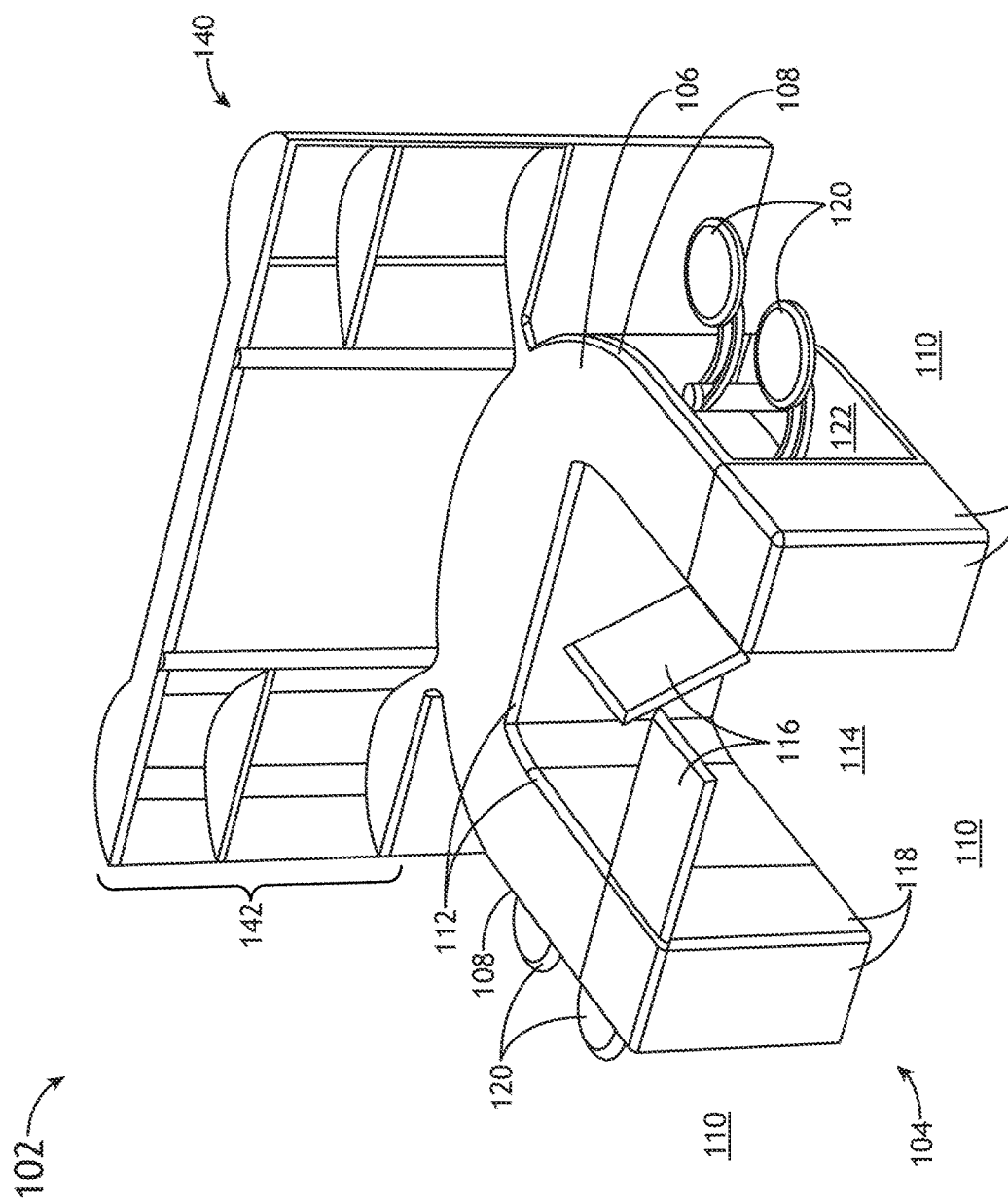
FIG. 4 illustrates a perspective view of an aircraft interior structure including a surface and an integrated footwell, in accordance with one or more embodiments of the disclosure.
Figure 5:
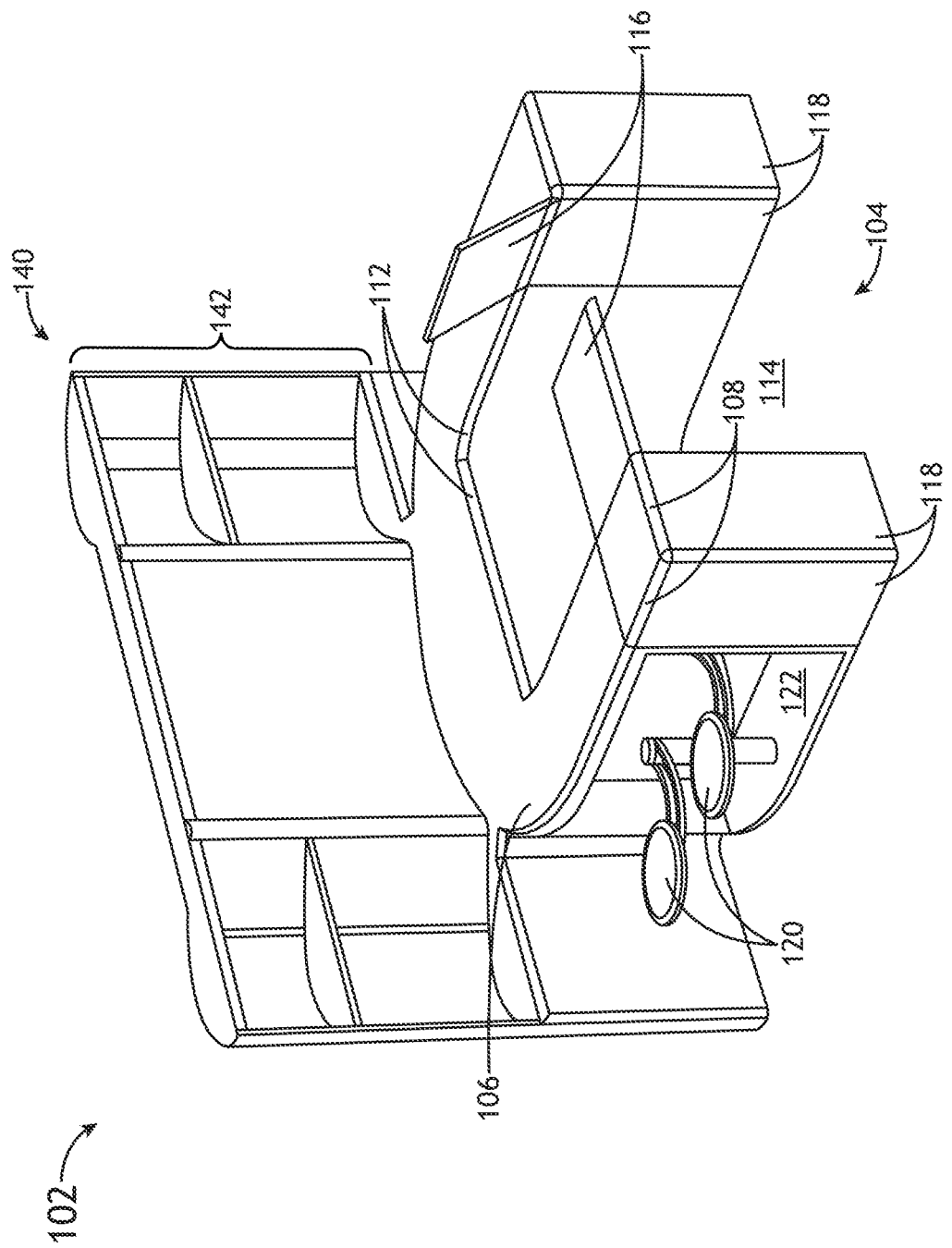
FIG. 5 illustrates a perspective view of an aircraft interior structure including a surface and an integrated footwell, in accordance with one or more embodiments of the disclosure.
Figure 6:
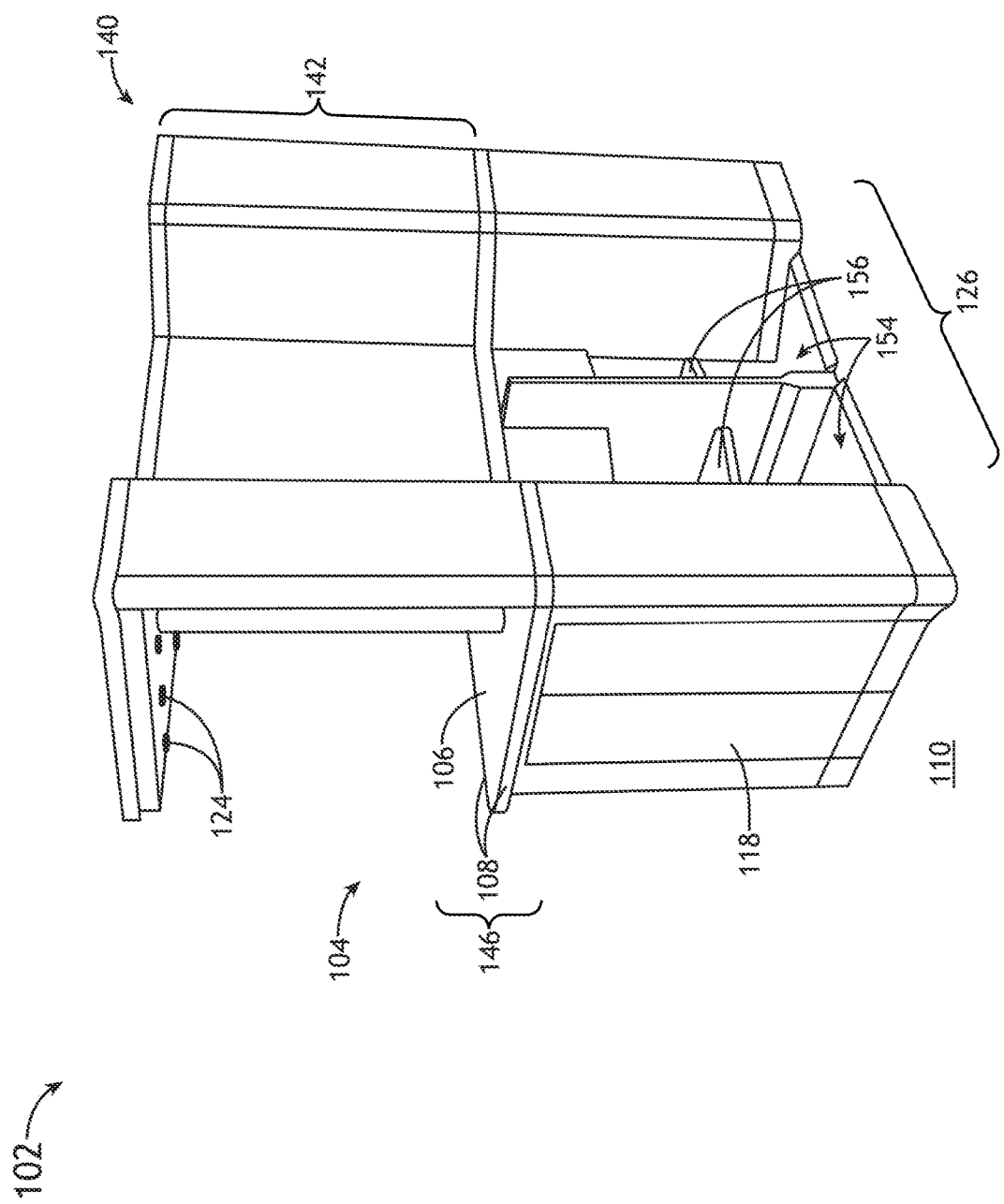
FIG. 6 illustrates a perspective view of an aircraft interior structure including a surface and an integrated footwell, in accordance with one or more embodiments of the disclosure.
Figure 7:
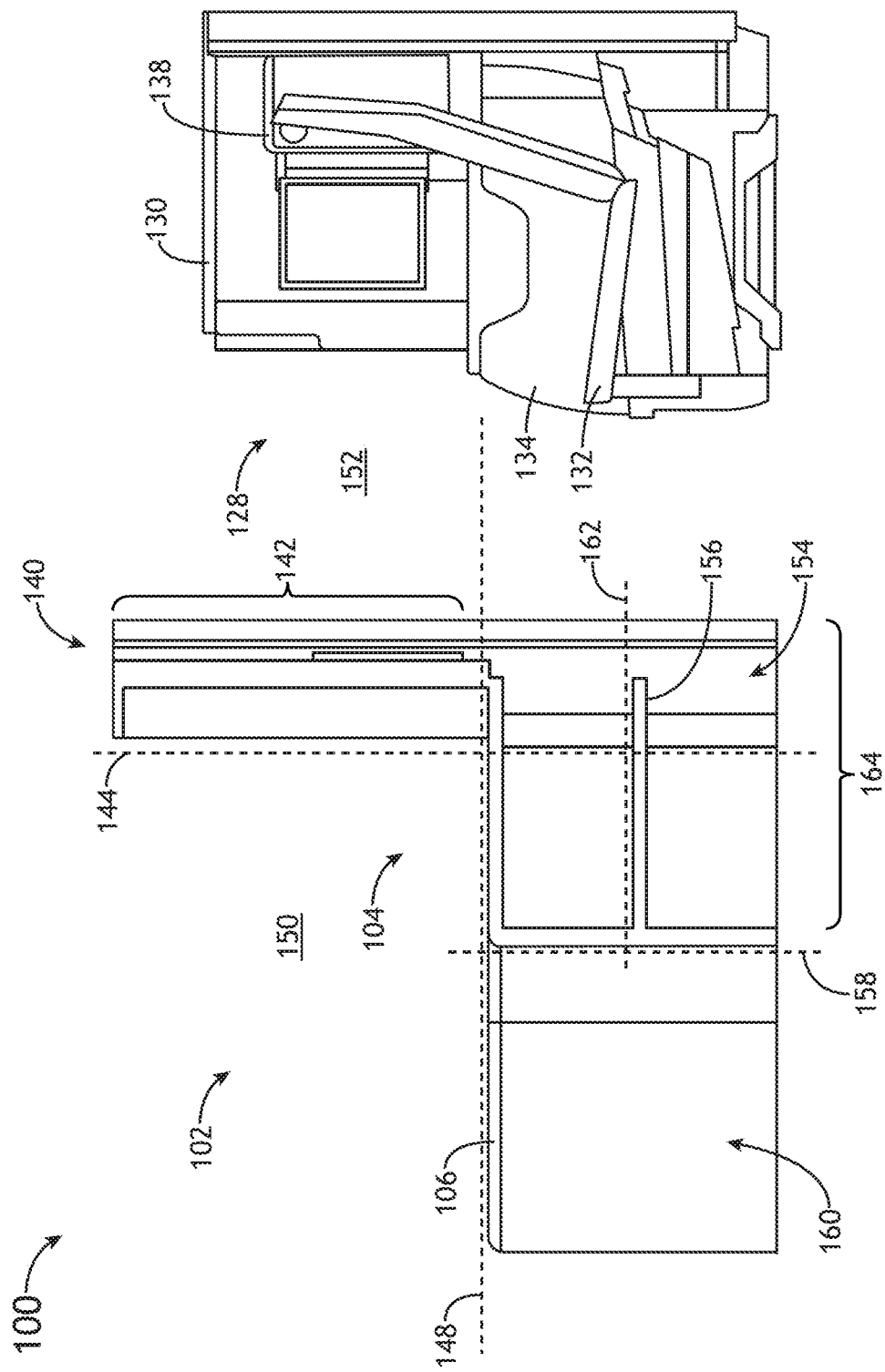
FIG. 7 illustrates an elevation view of an aircraft interior structure including a surface and an integrated footwell, in accordance with one or more embodiments of the disclosure.
Figure 8:
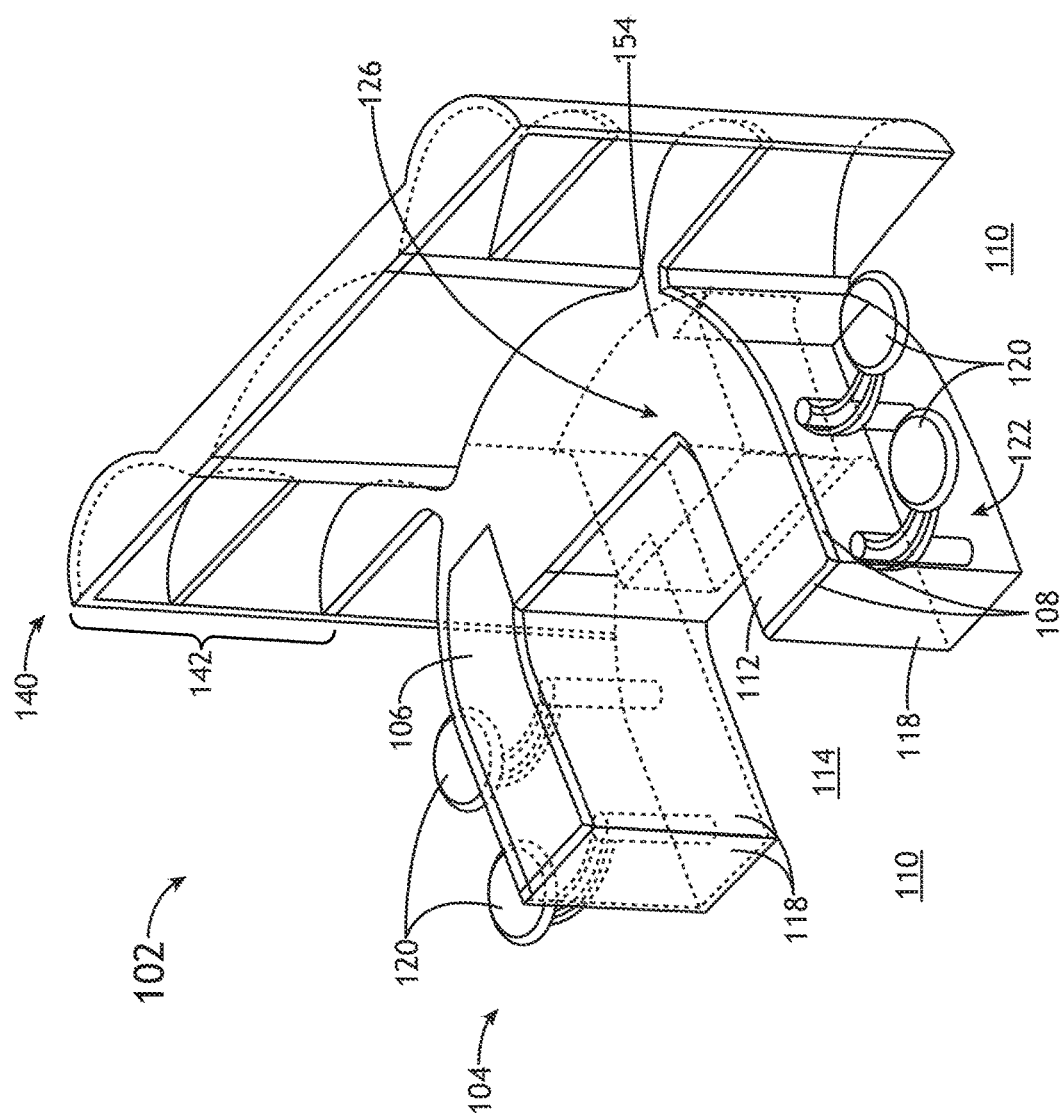
FIG. 8 illustrates a perspective view of an aircraft interior structure including a surface and an integrated footwell, in accordance with one or more embodiments of the disclosure.
Figure 9:
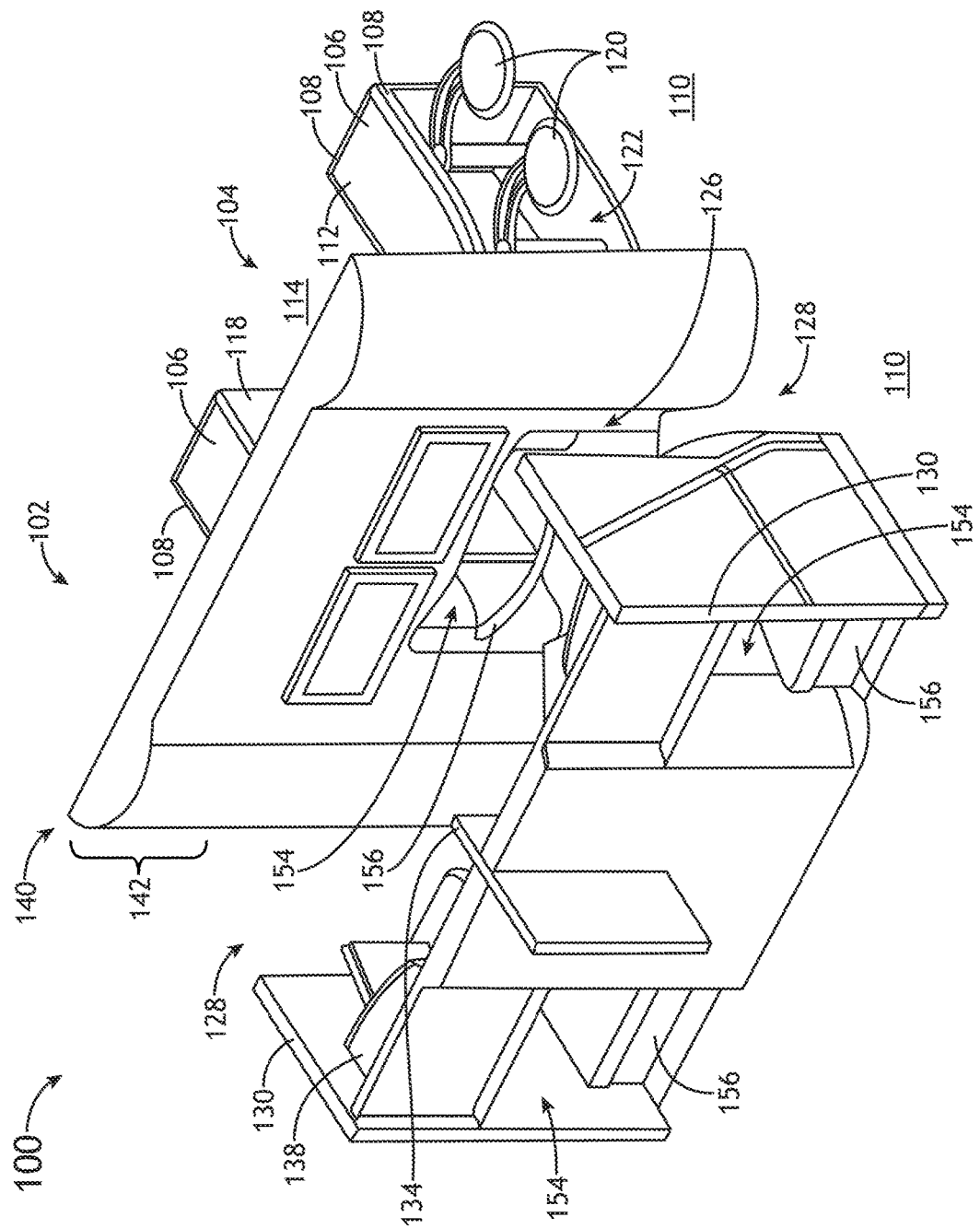
FIG. 9 illustrates a perspective view of an aircraft interior structure including a surface and an integrated footwell, in accordance with one or more embodiments of the disclosure.
Figure 10:
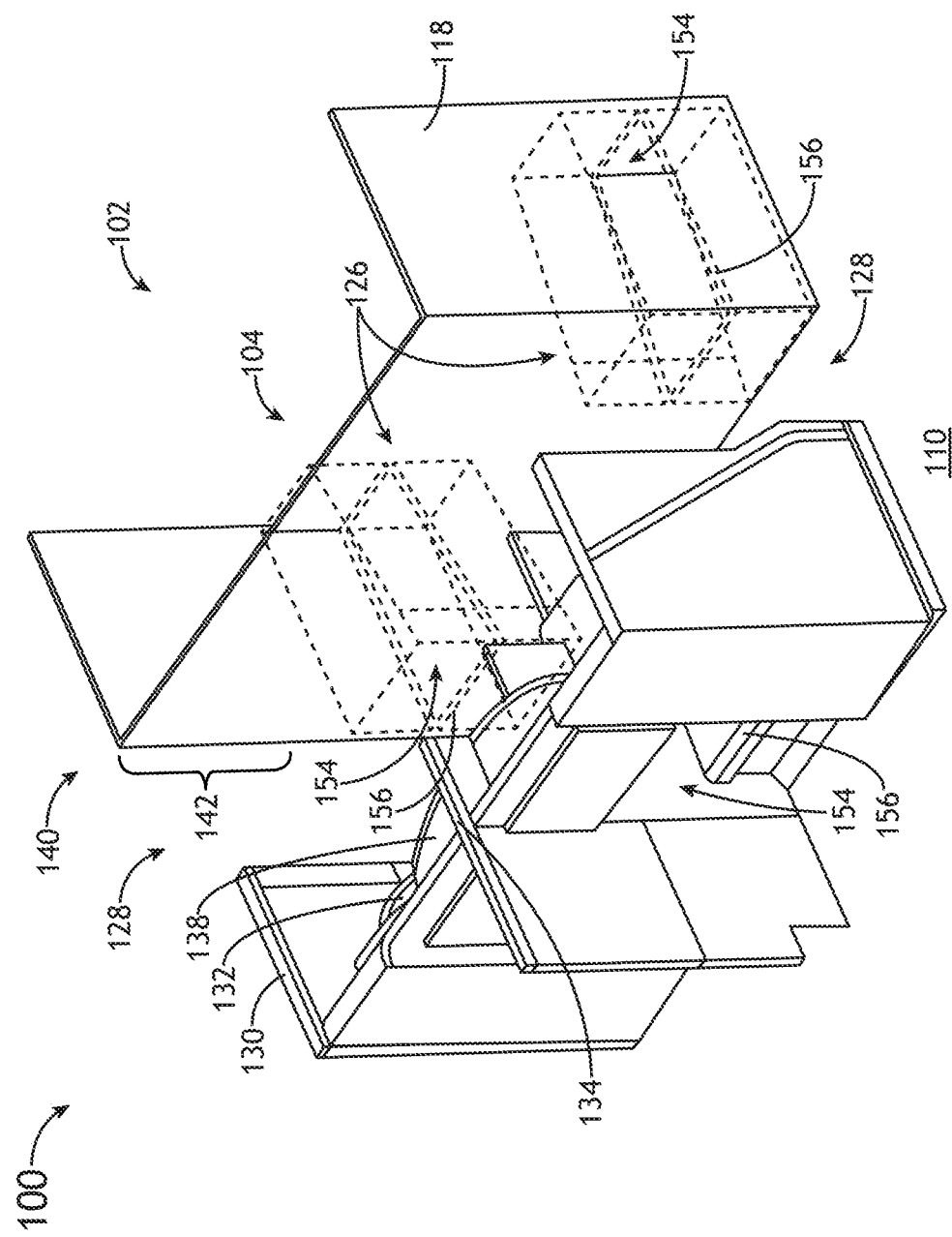
FIG. 10 illustrates a perspective view of an aircraft interior structure including a surface and an integrated footwell, in accordance with one or more embodiments of the disclosure.
Figure 11:
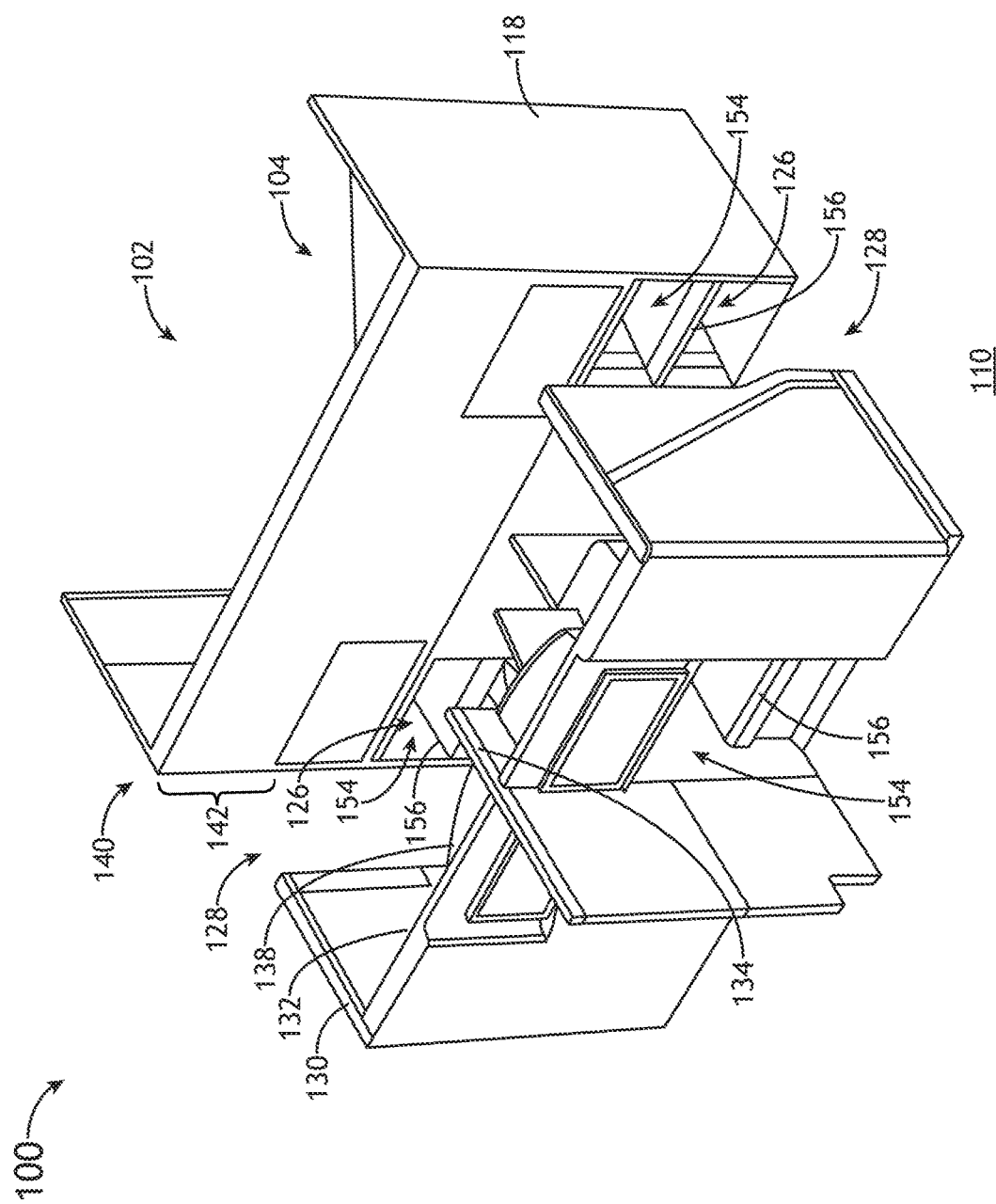
FIG. 11 illustrates a perspective view of an aircraft interior structure including a surface and an integrated footwell, in accordance with one or more embodiments of the disclosure.
Figure 12:
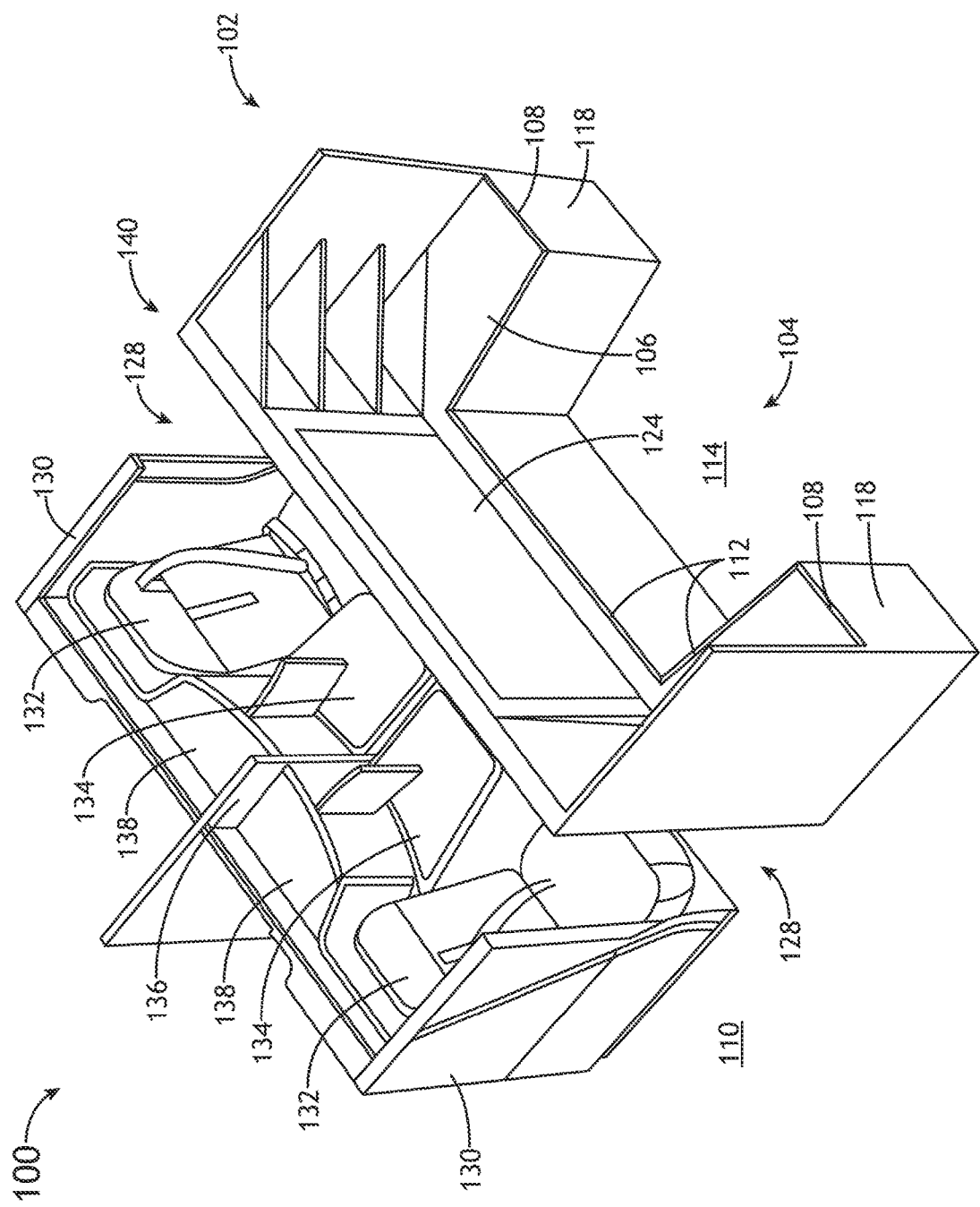
FIG. 12 illustrates a perspective view of an aircraft interior structure including a surface and an integrated footwell, in accordance with one or more embodiments of the disclosure.
Figure 13:
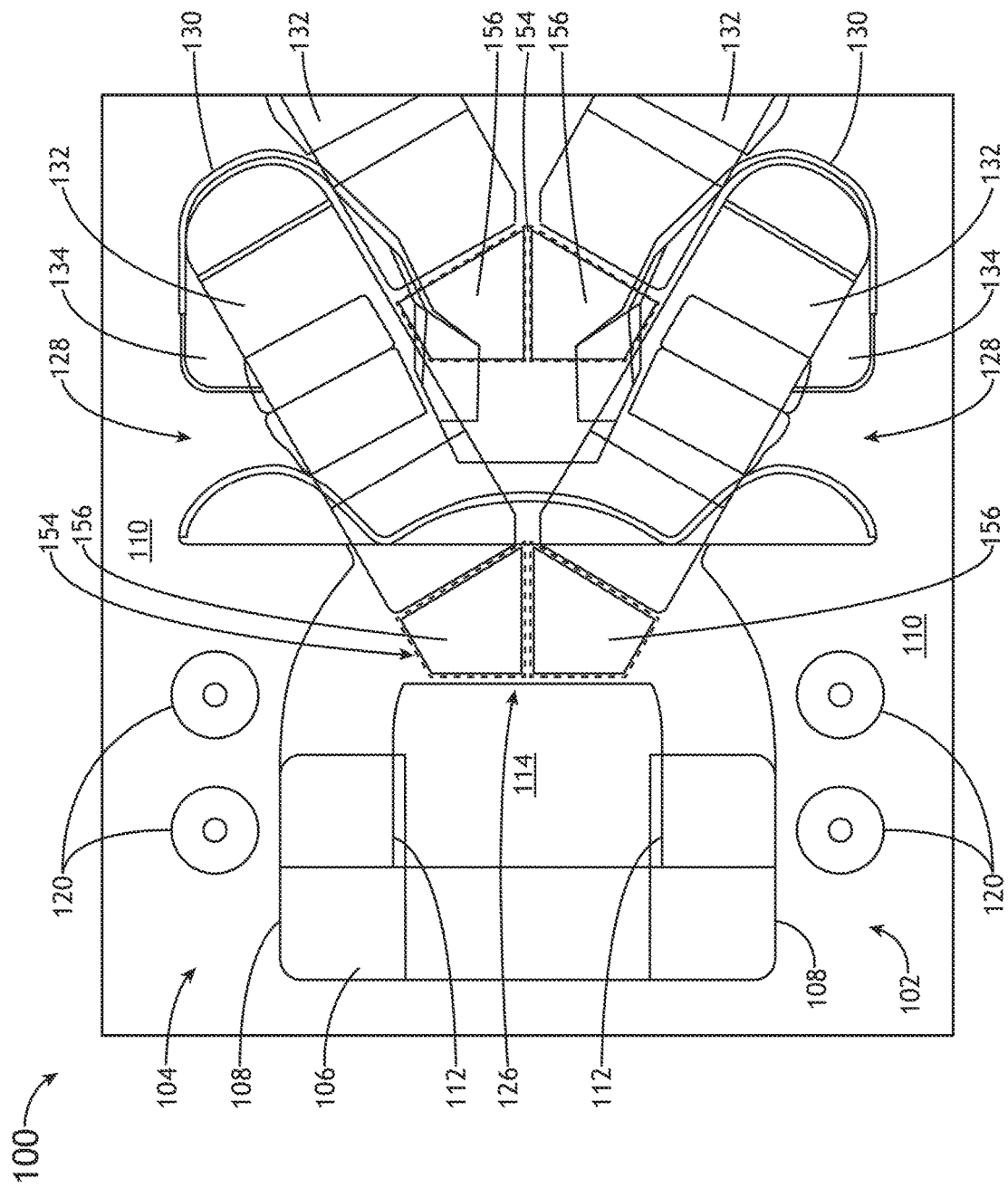
FIG. 13 illustrates a plan view of an aircraft interior structure including a surface and an integrated footwell, in accordance with one or more embodiments of the disclosure.

FIGS. 1-13 generally illustrate an aircraft interior structure including a surface and an integrated footwell, in accordance with one or more embodiments of the disclosure.

Aircraft cabin designs may include aircraft interior structures that are separately-constructed and separately-installed within the aircraft cabin. For example, the aircraft cabin may include an interior structure with one or more footwells and/or one or more ottomans for business class or first-class passenger compartments. By way of another example, the aircraft cabin may include an interior structure configured to operate as an attended bar, an unattended bar, a social area, a work surface, a stowage area, or other area around which passengers may congregate and/or in which passengers and/or crew members may stow or retrieve items.

The separate nature of the aircraft interior structures may result in a loss of valuable space (e.g., floor space, stowage space, or the like) within the aircraft cabin. However, aircraft cabin designs need to address competing interests for increased passenger seating, storage space, lavatories, galley spaces, and other structures and/or monuments. For example, arranging the layout of an aircraft cabin in order to increase passenger seating may require reducing an amount of room used for storage space, lavatories, galley spaces, and other structures and/or monuments. For instance, this reducing may include modifying the arrangement and/or design of components including, but not limited to, a galley, an aircraft lavatory, or other structures and/or monuments of the aircraft passenger cabin.

When modifying an aircraft cabin design to allow for a more compact arrangement, load-bearing/weight-bearing requirements must be met without losing the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide aircraft interior structures with integrated surfaces. For example, a social area surface may be integrated with passenger amenities such as footrests or ottomans into a single structure or monument to be installed within the aircraft cabin. The integrating of various aircraft interior components may reduce required installation space, resulting in an increase of available floor space for other aircraft interior structures and/or monuments while continuing to meet aviation guidelines and/or standards.

FIGS. 1-13 in general illustrate an aircraft cabin 100 and an aircraft interior structure 102 configured for the aircraft cabin 100.

The aircraft interior structure 102 may include a social area section 104. The social area section 104 may be configured as a passenger social area section 104. The social area section 104 may be configured as a crew member preparation area section 104. It is noted herein that the terms "section 104," "social area section 104," and "crew member preparation area section 104" may be considered equivalent, for purposes of the present disclosure.

The social area section 104 may include a surface 106. For example, the one or more surfaces 106 may include, but are not limited to, a countertop, a work surface, or other surface about which passengers may congregate and socialize and/or crew members may prepare food, drink, or the like for the passengers.

The surface 106 may include one or more tiers, where each tier is a select shape.

For example, the surface 106 may include one or more passenger-accessible exterior edges 108 within or proximate to a floor area 110 (e.g., an aircraft aisle 110, a walk space 110, a crew member preparation space 110 (e.g., a galley section 110), or the like) of the aircraft cabin 100. For instance, the surface 106 may be a solid shape (e.g., a geometric shape having no open areas, a shape representing an alphanumeric or ASCII character having no open areas, or the like) including the one or more passenger-accessible exterior edges 108.

By way of another example, the surface 106 may include one or more passenger-accessible exterior edges 108 within or proximate to the floor area 110, and one or more passenger-accessible interior edges 112 within or proximate to a bounded space 114 at least partially defined by a footprint of the surface 106. For instance, the surface 106 may be U-shaped, L-shaped, or another shape having an open area or bounded space 114 of the floor area 110 (e.g., a geometric shape having an open area, a shape representing an alphanumeric or ASCII character having an open area, or the like) and including the one or more passenger-accessible exterior edges 108 and the one or more passenger-accessible interior edges 112.

By way of another example, the surface 106 may include one or more passenger-accessible exterior edges 108 within or proximate to the floor area 110, and one or more crew member-accessible interior edges 112 within the bounded space 114 at least partially defined by a footprint of the surface 106. For instance, the surface 106 may be D-shaped, B-shaped, or another shape having an open area or bounded space 114 (e.g., a geometric shape having an open area, a shape representing an alphanumeric or ASCII character having an open area, or the like) and including the one or more passenger-accessible exterior edges 108 and the one or more crew member-accessible interior edges 112.

In one non-limiting example, the surface 106 may be operated as a social space within the aircraft cabin 100. In another non-limiting example, the surface 106 may be operated as a non-attended bar or other non-attended social space within the aircraft cabin 100. In another non-limiting example, the surface 106 may be operated as an attended bar or other attended service area within the aircraft cabin 100.

It is noted herein the open area or bounded space 114 may be configured to receive onboard aircraft components including, but not limited to, galley trolleys, or other moveable components for use when attending to passengers.

The surface 106 may include an actuatable portion 116. For example, the actuatable portion 116 may be rotatable about an axis (e.g., a hinged panel or door, or the like). By way of another example, the actuatable portion 116 may be translatable (e.g., a slidable door, or the like). By way of another example, the actuatable portion 116 may be removable/replaceable (e.g., a detachable door or barrier, or the like). In general, the actuatable portion 116 may include a non-fixed portion of the surface 106 configured to allow access to the one or more crew member-accessible interior edges 112 and the bounded space 114.

It is noted herein, however, that the one or more crew member-accessible interior edges 112 and the bounded space 114 may occur via a portion of the surface 106 that is fixed. For example, the social area section 104 may include an open space between the surface 106 and a floor area 110 of the aircraft cabin 100 (e.g., a crawl-under section of the surface 106). In this example, the actuatable portion 116 may not be required to access the one or more crew member-accessible interior edges 112 and the bounded space 114. Therefore, the above description should not be interpreted as a limitation on the present disclosure but merely an illustration.

The social area section 104 may include support structures 118 for the surface 106. The surface 106 may be supported at least in part by the support structures 118. For example, the support structures 118 may include, but are not limited to, frames, sub-frames, interior or exterior décor panels, shelving units without doors, stowage compartments with doors, or other components configured to position the surface 106 a select distance from the floor area 110 of the aircraft cabin 100.

The surface 106 may be surrounded at least in part with standing room in the aircraft cabin 100. For example, the standing room may be a portion of or proximate to the floor area 110. It is noted herein, however, that the standing room may be configured to not inhibit passage through the floor area 110 of the aircraft cabin 100.

The social area section 104 may include one or more seats 120 in the aircraft cabin 100 proximate to the one or more passenger-accessible exterior edges 108. For example, the one or more seats 120 may be fixed in place. By way of another example, the one or more seats 120 may be actuatable between a stowed position within a defined area 122 and a deployed position within the floor area 110. For instance, the one or more seats 120 may be rotatable about one or more axes between the stowed position and the deployed position. In addition, the one or more seats 120 may be translatable between the stowed position and the deployed position. Further, the one or more seats 120 may be some combination of rotatable and translatable between the stowed position and the deployed position. Where there are multiple seats 120, the one or more seats 120 may be the same height or different heights. For example, the one or more seats 120 may be a height configured for a bar, counter, high-top table, or the like. By way of another example, the one or more seats 120 may be a height configured for a low-top table, or the like. In general, the one or more seats 120 may be configured to not inhibit passage through the floor area 110 of the aircraft cabin 100.

The social area section 104 may include one or more accessories 124 configured to provide a visual and/or auditory output to passengers and/or crew members around the social area section 104. For example, the one or more accessories 124 may include, but are not limited to, one or more lights or lighted panels, one or more in-flight entertainment (IFE) devices, one or more speakers configured to provide media content separate from or accompanying the media content shown on the in-flight entertainment (IFE) devices, or the like.

The aircraft interior structure 102 may include a passenger seating section 126. The passenger seating section 126 may be proximate to one or more passenger compartments 128. For example, the one or more passenger compartments 128 may be entirely separate (e.g., fully separated by privacy panels or divider panels). By way of another example, adjacent passenger compartments 128 may occupy a shared portion of the floor area 110 of the aircraft cabin 100.

A passenger compartment 128 may include a privacy shell 130 with one or more privacy shell elements. The privacy shell 130 may include an opening within the one or more privacy shell elements into the passenger compartment 128, the opening configured to lead to an aircraft aisle 110 of the aircraft cabin 100. The passenger compartment 128 may include a door for the opening. For example, the door may swing or slide into an open position against the one or more privacy shell elements. By way of another example, one or more privacy shell elements may be at least partially hollow, and the door may be slid into a cavity defined in the one or more privacy shell elements.

A passenger compartment 128 may include one or more aircraft seats 132 (e.g., business class or first-class passenger seats) positioned proximate to the aircraft interior structure 102. It noted herein the terms "aircraft seats" and "passenger seats" may be considered equivalent, for purposes of the disclosure.

In general, an aircraft seat 132 may be translatable (e.g., trackable or slidable). The aircraft seat 132 may be rotatable about an axis cross-wise through the aircraft seat 132 into a position including, but not limited to, an upright or raised position, one or more lounge or reclined positions, and a lie-flat or bed position. For example, the aircraft seat 132 may transition directly between the upright position and the lie-flat or bed position. By way of another example, it is noted herein the aircraft seat 132 may transition through one or more reclined positions between the upright position and the lie-flat or bed position. By way of another example, the aircraft seat 132 may transition into one or more reclined positions in a motion separate from the transition between the upright position and the lie-flat or bed position. Therefore, the above description should not be interpreted as a limitation on the scope of the disclosure but merely an illustration.

The aircraft seat 132 may be rotatable about an axis (e.g., swivelable). The aircraft seat 132 may be fully positionable between the outer limits of motion as defined by the moveable components of the aircraft seat 132, one or more primary monuments 134, and/or one or more auxiliary monuments 136 of the passenger compartment 128. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 132 may be actuatable (e.g., translatable and/or rotatable) from the TTOL position to a non-TTOL position, and/or vice versa. Further, it is noted herein the aircraft seat 132 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

The aircraft seat 132 may be configured to avoid contact with the one or more primary monuments 134 when transitioning between positions (e.g., between the upright or raised position and the lie-flat or bed position). The one or more primary monuments 134 may include or may be implemented as a divider panel or structure separating adjacent passenger compartments 128 and/or between a passenger compartment 128 from a floor area 110 within the aircraft cabin 100. For example, where the one or more primary monuments 134 are implemented as separators, the one or more primary monuments 134 may be configured to allow for the multiple passenger compartments 128 to be installed within the aircraft cabin 100 in a more compact arrangement. In this regard, the amount of floor area 110 of the aircraft cabin 100 necessary for the one or more aircraft seats 132 may be reduced.

The one or more auxiliary monuments 136 may include, but are not limited to, a tray or table, a side stand, or the like. The aircraft seat 132 may be configured to avoid contact with the one or more auxiliary monuments 136 when transitioning between positions (e.g., between the upright or raised position and the lie-flat or bed position).

The auxiliary monument 136 may include a top surface, a bottom surface, and/or one or more side surfaces. For example, the auxiliary monument 136 may include a single continuous side surface where all corners are rounded. By way of another example, the auxiliary monument 136 may include up to an N number of side surfaces where the auxiliary monument 136 includes up to an N number of corners. The auxiliary monument 136 may be fixed in position. It is noted herein, however, that the auxiliary monument 136 may be actuatable (e.g., may extend a select distance from a stored position to an extended position proximate to a passenger, similar to an aircraft tray table).

The auxiliary monument 136 may be proximate to a different primary monument 134 used as a separator between adjacent passenger compartments 128 and/or between a passenger compartment 128 and a floor area 110 within the aircraft cabin 100. For example, the auxiliary monument 136 may be positioned above a primary monument 134. The auxiliary monument 136 may be integrated into the primary monument 134 used as a separator between adjacent aircraft seats 132 and/or between an aircraft seat 132 and an open area within the aircraft cabin 100. In this regard, the amount of floor area 110 of the aircraft cabin 100 necessary for the one or more aircraft seats 132 may be reduced.

It is noted herein that at least some components (e.g., at least a portion of the privacy shell 130, a primary monument 134, an auxiliary monument 136, or the like) may conform to a portion of an aircraft seat 132. In this regard, the amount of floor area 110 of the aircraft cabin 100 necessary for the one or more aircraft seats 132 may be reduced.

The passenger compartment 128 may include one or more storage compartments 138. The one or more storage compartments 138 may be positioned proximate to or integrated within the one or more privacy shell elements of the privacy shell 130, the one or more primary monuments 134, the one or more auxiliary monuments 136, or the like. The one or more storage compartments 138 may be coupled to and/or at least be partially inset in the one or more privacy shell elements of the privacy shell 130, the one or more primary monuments 134, the one or more auxiliary monuments 136, or the like.

A storage compartment 138 may be a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

A storage compartment 138 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

A storage compartment 138 may include one or more electronic connections for one or more passenger amenities such as, but not limited to, one or more charging ports, one or more charging cables, or the like.

A storage compartment 138 may include one or more electronic connections in communication with one or more components of the passenger compartment 128 such as, but not limited to, one or more display device connection ports, one or more display device connection cables, one or more audio output jacks (e.g., headphone jacks), one or more audio input jacks, or the like.

A storage compartment 138 may include one or more safety devices (e.g., air masks, personal floatation devices, or the like).

The passenger compartment 128 may include one or more electronics or electronic devices. For example, the one or more electronics or electronic devices may include, but are not limited to, one or more aircraft seat 132 actuation devices (e.g., assemblies, controls, actuators, and/or the like), one or more in-flight entertainment (IFE) devices, one or more speakers configured to provide media content separate from or accompanying the media content shown on the in-flight entertainment (IFE) devices, one or more lights, or the like.

The aircraft interior structure 102 may include a partition 140. The partition 140 may include a vertical or substantially-vertical section 142 configured to separate the social area section 104 from the passenger seating section 126 (e.g., business class or first-class passenger seats). The social area section 104 side of the partition 140 may include, but is not limited to, interior or exterior décor panels, shelving units without doors, stowage compartments with doors, and/or in-flight entertainment devices (IEDs).

The surface 106 may be coupled proximate to a vertical or substantially-vertical plane 144 defined by the partition 140 (e.g., defined by the vertical or substantially-vertical section 142 of the partition 140) on the social area section 104 side. For example, the surface 106 may abut the vertical or substantially-vertical plane 144. By way of another example, the surface 106 may breach the vertical or substantially-vertical plane 144 and be at least partially inset within the partition 140 (e.g., within the vertical or substantially-vertical section 142 of the partition 140). The surface 106 may face a single direction into the social area section 104 side or multiple directions (e.g., the surface 106 may include a wrap-around section 146 configured to be accessible via the floor area 110 of the aircraft cabin 100).

The passenger seating section 126 side of the partition 140 may include, but is not limited to, interior or exterior décor panels, shelving units without doors, stowage compartments with doors, and/or in-flight entertainment devices (IEDs) configured to be accessible by passengers in the aircraft seats 132 positioned proximate to the aircraft interior structure 102.

At least a portion of the partition 140 may separate the social area section 104 and the passenger seating section 126. For example, the vertical or substantially-vertical section 142 of the partition 140 (e.g., at or above a plane 148 defined by the surface 106 in the social area section 104) may prevent access or viewing between a first portion 150 of the social area section 104 (e.g., at or above the plane 148 defined by the surface 106 in the social area section 104) and at least a second portion 152 of the passenger seating section 126 (e.g., at or above the plane 148 defined by the surface 106 in the social area section 104).

The passenger seating section 126 may include one or more footwells 154 configured to be usable by one or more passengers in one or more aircraft seats 132 positioned proximate to the aircraft interior structure 102. The passenger seating section 126 may include one or more ottomans 156 positioned within the one or more footwells 154. For example, the one or more ottomans 156 may be fixed in place. By way of another example, the one or more ottomans 156 may be configured to transition between a first position and at least a second position. For instance, at least a portion of an ottoman 156 may be configured to translate, may be configured to rotate about an axis, or may be configured to translate and rotate about an axis.

An ottoman 156 may be usable by a passenger in an aircraft seat 132 positioned proximate to the aircraft interior structure 102 when the corresponding aircraft seat 132 is in a lie-flat or bed position. For example, the ottoman 156 may form a portion of a bed surface when the corresponding aircraft seat 132 is in the lie-flat or bed position. The ottoman 156 may be usable by a passenger in an aircraft seat 132 positioned proximate to the aircraft interior structure 102 when the corresponding aircraft seat 132 is in a reclined or lounge position.

The ottoman 156 may be positioned within a footwell 154 of the passenger seating section 126. For instance, one or more dimensions of the footwell 154 may be changed by transitioning the aircraft seat 132 between the upright or raised position, a lounge or reclined position, and the lie-flat or bed position. It is noted herein that a portion of the ottoman 156 may be actuatable (e.g., along a set of tracks or linear rails) to a position outside of the footwell 154.

The ottoman 156 may be configured to translate and/or rotate about an axis through a sidewall of the ottoman 156 to point a top surface to a passenger occupying the aircraft seat 132. For example, where the ottoman 156 may be configured to both translate and rotate, the ottoman 156 may be configured to independently rotate and/or translate. By way of another example, where the ottoman 156 may be configured to both translate and rotate, a rotation may prevent further translation until the ottoman 156 is returned to a select position and/or a translation may prevent further rotation until the ottoman 156 is returned to a select position.

It is noted herein, however, the aircraft seat 132 and/or the ottoman 156 may be limited to an upright or raised position and/or one or more lounge or reclined positions. In addition, it is noted herein the aircraft seat 132 may be the sole component forming a bed when the aircraft seat 132 is in a lie-flat or bed position. Therefore, the above description should not be interpreted as a limitation on the present disclosure but merely an illustration.

The passenger seating section 126 may break the vertical or substantially-vertical plane 144 defined by the partition 140, and be at least partially inset within the social area section 104 up against a second vertical or substantially-vertical plane 158 in a second portion 160 of the social area section 104 (e.g., at or below the plane 148 defined by the surface 106 in the social area section 104). For example, components of the passenger seating section 126 (e.g., panels defining the footwell 154, or the like) at a horizontal or substantially-horizontal plane 162 of the passenger seating section 126 and/or at the second vertical or substantially-vertical plane 158 of the passenger seating section 126 may be configured to operate as support structures 118 for the surface 106 within the social area section 104.

In this regard, at least a portion 164 of the passenger seating section 126 (e.g., the footwells 154 and/or the ottomans 156) may be considered integrated with the surface 106 within the social area section 104, as the passenger seating section 126 is at least partially positioned underneath the surface 106 (and the partition 140). It is noted herein that integrating the passenger seating section 126 with the surface 106 may reduce the combined area required for the footprints of the passenger seating section 126 and the social area section 104, as compared to if the sections were separately-constructed for and/or separately-installed within the aircraft cabin 100.

The aircraft seats 132 may be parallel or substantially parallel to the floor area 110 (e.g., where the floor area 110 is an aircraft aisle 110) and directly face the aircraft interior surface 106. For example, the aircraft seats 132 may be positioned proximate to one another (e.g., are center seats separated from the floor area 110 by some distance). For instance, portions of the passenger seating section 126 (e.g., the one or more footwells 154 and/or the one or more ottomans 156) corresponding to the aircraft seats 132 may be centered within the passenger seating section 126 of the aircraft interior structure 102 and positioned proximate to one another (e.g., either are in a separated space or are in a shared space). By way of another example, the aircraft seats 132 may be positioned proximate to the floor area 110 (e.g., are separated by some distance). For instance, the footwells 154 corresponding to the aircraft seats 132 may be separated by some distance and proximate to one or more exterior or outer support structures 118 of the aircraft interior structure 102. It is noted herein that "substantially parallel" may include an angle of variance ranging between 0 degrees and 7 degrees, for purposes of the present disclosure.

Although embodiments of the disclosure illustrate a single surface 106 (either solid or with an internal open area), it is noted herein the social area section 104 may include multiple surfaces 106 (e.g., either entirely separate or substantially separate). For example, the multiple surfaces 106 may be necessary where the passenger seating sections 126 (e.g., footwells 154 and/or ottomans 156) corresponding to the aircraft seats 132 may be separated by some distance. Therefore, the above description should not be interpreted as a limitation on the present disclosure but merely an illustration.

The aircraft seats 132 may be set at an angle relative to the floor area 110 (e.g., where the floor area 110 is an aircraft aisle 110) and relative to the aircraft interior structure 102. For example, the aircraft seats 132 may be positioned proximate to the floor area 110 (e.g., the aircraft seats 132 may be separated by some distance), while the footwells 154 corresponding to the aircraft seats 132 may be positioned proximate to one another (e.g., either may be separated or shared). By way of another example, the aircraft seats 132 may be positioned proximate to one another (e.g., either may be separated or shared), while the footwells 154 corresponding to the aircraft seats 132 may be positioned proximate to the floor area 110 (e.g., the footwells 154 may be separated by some distance).

It is noted herein the passenger seating section 126 may be configured to include one or more footwells 154 and one or more ottomans 156 for additional passenger compartments 128 positioned underneath the one or more aircraft seats 132, the one or more primary monuments 134, the one or more auxiliary monuments 136, and/or the one or more storage compartments 138 within the passenger seating section 126.

Although embodiments of the disclosure are directed to an aviation environment such as an aircraft cabin 100, it is noted herein the aircraft interior structure 102 including a surface 106 and an integrated footwell 154 is not limited to the aviation environment and/or the aircraft components within the aviation environment. For example, the aircraft interior structure 102 including a surface 106 and an integrated footwell 154 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the aircraft interior structure 102 including a surface 106 and an integrated footwell 154 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft interior structure, comprising:
    a social area section including a surface, the social area section including at least a first portion and a second portion, the first portion positioned at or above a plane defined by the surface, the second portion positioned at or below the plane defined by the surface, the social area section being accessible from a floor area of an aircraft cabin;
    a passenger seating section positioned forward an aircraft seat, the passenger seating section including at least a first portion and a second portion, the first portion of the passenger seating section including a footwell; and
    a fixed partition including a fixed substantially-vertical section, the fixed substantially-vertical section configured to fully separate the second portion of the passenger seating section and the first portion of the social area section, the fixed substantially-vertical section alone preventing one of access or viewing between the first portion of the social area section and at least the second portion of the passenger seating section,
    the footwell of the passenger seating section being positioned underneath at least one of the fixed partition or the surface of the social area section in the second portion of the social area section.

2. The aircraft interior structure of claim 1, the footwell being centered within the passenger seating section of the aircraft interior structure.

3. The aircraft interior structure of claim 1, the passenger seating section further including an ottoman within the footwell, the ottoman and the aircraft seat configured to form a bed surface when the aircraft seat is in a lie-flat position.

4. The aircraft interior structure of claim 1, the floor area including an aircraft aisle.

5. The aircraft interior structure of claim 4, the aircraft seat being parallel to the aircraft aisle.

6. The aircraft interior structure of claim 4, the aircraft seat being set at an angle relative to the aircraft aisle.

7. The aircraft interior structure of claim 4, further comprising:
 a plurality of support structures, the plurality of support structures being configured to at least one of support the surface or define the passenger seating section.

8. The aircraft interior structure of claim 7, the footwell being proximate to the aircraft aisle and at least one exterior support structure of the plurality of support structures.

9. The aircraft interior structure of claim 1, the surface including at least one accessible exterior edge proximate to the floor area, the exterior edge being accessible from the floor area.

10. The aircraft interior structure of claim 9, the surface including at least one accessible interior edge proximate to a bounded space of the floor area, the interior edge being accessible from the bounded space.

11. The aircraft interior structure of claim 10, the surface including at least one actuatable portion, the at least one actuatable portion configured to provide access to the at least one accessible interior edge and the bounded space of the floor area.

12. The aircraft interior structure of claim 9, the social area section including at least one seat proximate to the at least one passenger-accessible exterior edge.

13. The aircraft interior structure of claim 12, the at least one seat being fixed in position.

14. The aircraft interior structure of claim 12, the at least one seat configured to actuate between a stowed position and a deployed position.

15. An aircraft cabin, comprising:
 at least one passenger compartment, the at least one passenger compartment including an aircraft seat;
 a floor area; and
 an aircraft interior structure, comprising:
  a social area section including a surface, the social area section including at least a first portion and a second portion, the first portion positioned at or above a plane defined by the surface, the second portion positioned at or below the plane defined by the surface, the social area section being accessible from the floor area;
  a passenger seating section positioned forward the aircraft seat of the at least one passenger compartment, the passenger seating section including at least a first portion and a second portion, the first portion of the passenger seating section including a footwell; and
  a fixed partition including a fixed substantially-vertical section, the fixed substantially-vertical section configured to fully separate the second portion of the passenger seating section and the first portion of the social area section, the fixed substantially-vertical section alone preventing one of access or viewing between the first portion of the social area section and at least the second portion of the passenger seating section,
  the footwell of the passenger seating section being positioned underneath at least one of the fixed partition or the surface of the social area section in the second portion of the social area section.

\* \* \* \* \*